(12) United States Patent
Yin et al.

(10) Patent No.: US 10,977,352 B2
(45) Date of Patent: Apr. 13, 2021

(54) METHOD FOR ACCESSING TARGET APPLICATION, AND TERMINAL

(71) Applicant: Huawei Technologies Co., Ltd., Shenzhen (CN)

(72) Inventors: Junjie Yin, Shenzhen (CN); Lei Song, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 236 days.

(21) Appl. No.: 16/089,748

(22) PCT Filed: Apr. 5, 2016

(86) PCT No.: PCT/CN2016/078465
§ 371 (c)(1),
(2) Date: Sep. 28, 2018

(87) PCT Pub. No.: WO2017/173575
PCT Pub. Date: Oct. 12, 2017

(65) Prior Publication Data
US 2019/0318072 A1  Oct. 17, 2019

(51) Int. Cl.
*G06F 21/32* (2013.01)
*H04W 12/00* (2009.01)
(Continued)

(52) U.S. Cl.
CPC .......... *G06F 21/32* (2013.01); *H04L 63/083* (2013.01); *H04L 63/0884* (2013.01);
(Continued)

(58) Field of Classification Search
CPC .. G06F 21/32; H04W 12/0023; H04L 63/083; H04L 63/0884; H04M 1/72525; H04M 1/72577; G06K 9/00087
See application file for complete search history.

(56) References Cited

U.S. PATENT DOCUMENTS 8,831,557 B2 * 9/2014 Jung ..................... H04W 12/08
455/404.2
9,788,197 B2 * 10/2017 Yang ..................... H04W 12/02
(Continued)

FOREIGN PATENT DOCUMENTS

| CN | 1905446 A | 1/2007 |
| CN | 102567686 A | 7/2012 |

(Continued)

OTHER PUBLICATIONS

Machine Translation and Abstract of Chinese Publication No. CN102567686, dated Jul. 11, 2012, 8 pages.
(Continued)

*Primary Examiner* — Yonas A Bayou
(74) *Attorney, Agent, or Firm* — Conley Rose, P.C.

(57) ABSTRACT

A method for accessing a target application, where the method is applied to a terminal device on which a target application is installed, the target application is set with an application password to access the target application, the terminal device is set with first fingerprint information to unlock the terminal device, the terminal device is further set with an operation sequence corresponding to the first fingerprint information, and the operation sequence includes unlocking the terminal device and accessing the target application.

20 Claims, 7 Drawing Sheets

(51) Int. Cl.
*H04L 29/06* (2006.01)
*H04M 1/725* (2006.01)
*G06K 9/00* (2006.01)

(52) U.S. Cl.
CPC ... *H04M 1/72525* (2013.01); *H04M 1/72577* (2013.01); *H04W 12/0023* (2019.01); *G06K 9/00087* (2013.01)

(56) References Cited

U.S. PATENT DOCUMENTS

| | | | |
|---|---|---|---|
| 2006/0080525 | A1 | 4/2006 | Ritter et al. |
| 2006/0165263 | A1* | 7/2006 | Niitsuma ............... G06F 21/32 382/115 |
| 2007/0028299 | A1 | 2/2007 | Albano |
| 2015/0161836 | A1* | 6/2015 | Park .................... B60R 25/2045 340/5.51 |
| 2015/0278498 | A1* | 10/2015 | Hong ..................... G06F 21/35 340/5.82 |
| 2015/0294101 | A1 | 10/2015 | Wen |
| 2015/0350178 | A1* | 12/2015 | Yang ...................... G06F 21/32 713/168 |
| 2016/0299556 | A1* | 10/2016 | Jueng .................. G06K 9/0002 |
| 2016/0342781 | A1* | 11/2016 | Jeon ...................... G06F 1/1684 |
| 2018/0321797 | A1* | 11/2018 | Liu ........................ G06F 21/32 |

FOREIGN PATENT DOCUMENTS

| | | | |
|---|---|---|---|
| CN | 103886239 A | * | 6/2014 |
| CN | 103886239 A | | 6/2014 |
| CN | 103902147 A | | 7/2014 |
| CN | 104143060 A | | 11/2014 |
| CN | 104346549 A | | 2/2015 |
| CN | 104573454 A | | 4/2015 |
| EP | 1646254 A1 | | 4/2006 |

OTHER PUBLICATIONS

Machine Translation and Abstract of Chinese Publication No. CN103886239, dated Jun. 25, 2014, 15 pages.
Machine Translation and Abstract of Chinese Publication No. CN104573454, dated Apr. 29, 2015, 4 pages.
Foreign Communication From a Counterpart Application, PCT Application No. PCT/CN2016/078465, English Translation of International Search Report dated Jan. 5, 2017, 2 pages.
Foreign Communication From a Counterpart Application, PCT Application No. PCT/CN2016/078465, English Translation of Written Opinion dated Jan. 5, 2017, 7 pages.
Machine Translation and Abstract of Chinese Publication No. CN104143060, Nov. 12, 2014, 14 pages.
Machine Translation and Abstract of Chinese Publication No. CN104346549, Feb. 11, 2015, 15 pages.
Machine Translation and Abstract of European Publication No. EP1646254, Apr. 12, 2006, 14 pages.
Foreign Communication From a Counterpart Application, Chinese Application No. 201680083865.6, Chinese Office Action dated Apr. 15, 2019, 8 pages.

* cited by examiner

| Fingerprint index | Operation sequence | Invoke an API |
|---|---|---|
| Fingerprint A | Unlock a screen | API_1 |
| Fingerprint B | Unlock a screen | API_1 |
| | Access an application X | API_2 |
| Fingerprint C | Unlock a screen | API_1 |
| | Access an application X | API_2 |
| | Access a function Y in the application X | API_3 |

METHOD FOR ACCESSING TARGET APPLICATION, AND TERMINAL

CROSS-REFERENCE TO RELATED APPLICATIONS

This application is a U.S. National Stage of International Patent Application No. PCT/CN2016/078465 filed on Apr. 5, 2016, which is hereby incorporated by reference in its entirety.

TECHNICAL FIELD

The present invention relates to the field of mobile communications technologies, and in particular, to a method for accessing a target application, and a terminal.

BACKGROUND

Figure 1A:
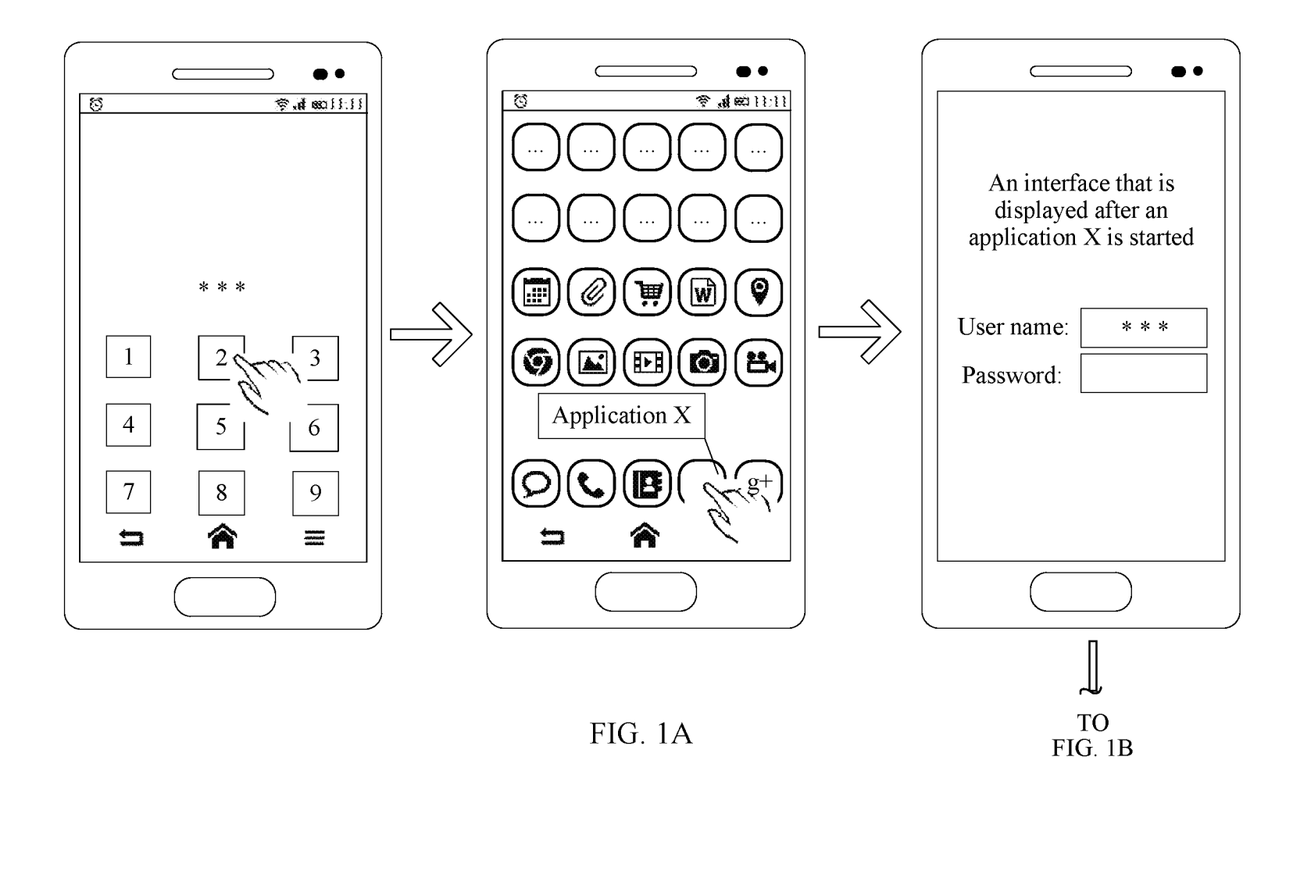
FIG. 1A and FIG. 1B are a schematic diagram of a method for accessing a target function of a target application in the prior art.
Figure 1B:
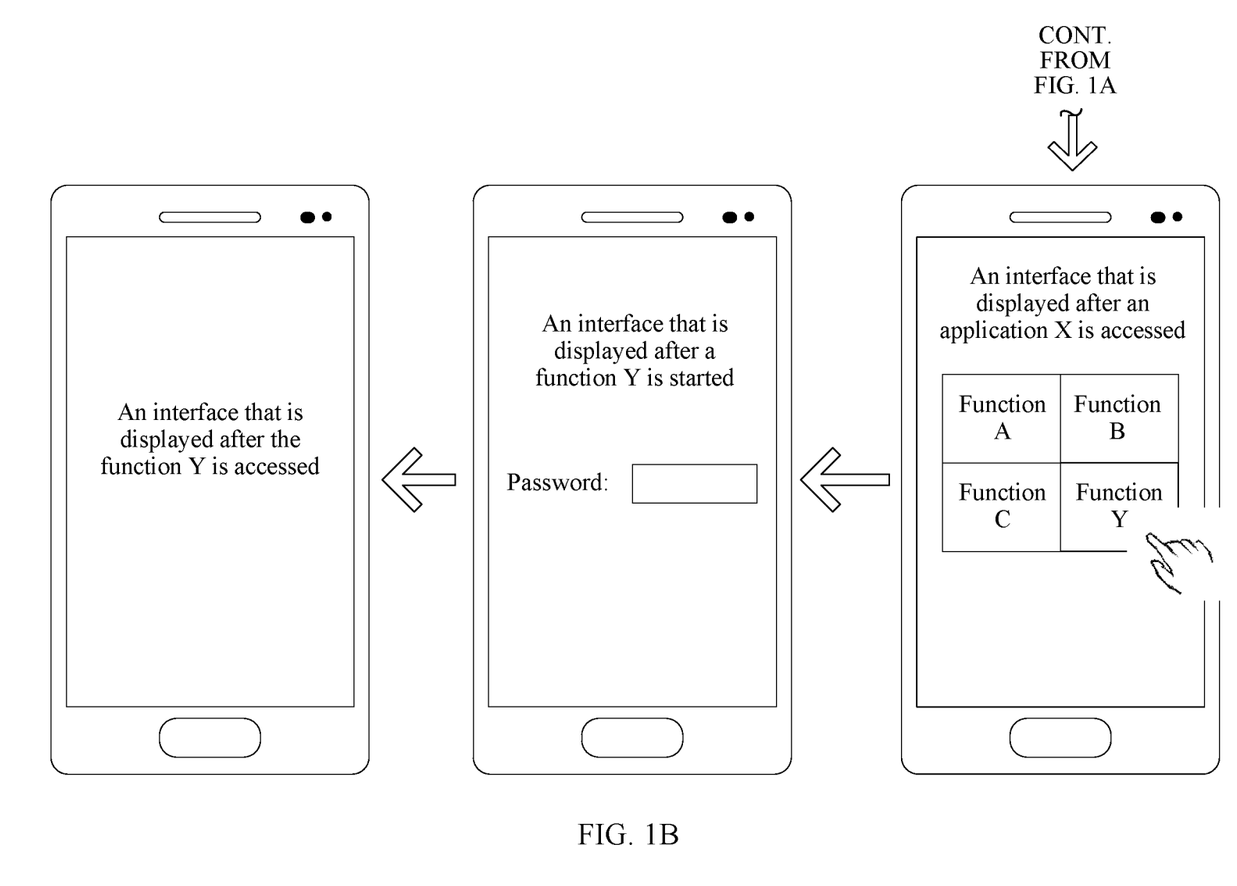

For the sake of security, a user usually sets a screen locking password for a mobile phone, and the user may unlock a screen by inputting a password, a gesture, a fingerprint image, or the like. Multiple applications (Application) are usually installed on the mobile phone. For some important or privacy-related applications, for example, an album, a social application, and a payment application, the user usually also sets application passwords, and the user can access these applications only when inputting correct passwords. In this way, security of user information in these applications can be ensured even if the mobile phone is in an unlocked state. However, in this case, as shown in FIG. 1A and FIG. 1B, if the user wants to access, when a terminal device is in a screen locking state, an application X that is set with an application password, the user can access the application X only after the user first inputs a screen unlocking password, finds the application X, starts the application X, and inputs the application password. If the user also wants to further access a function Y that is set with a function password in the application X, the user further needs to find the function Y, start the function Y, and input the function password, to access the function Y. It can be learned that the foregoing operations not only are relatively cumbersome, but also take a long time.

SUMMARY

To resolve the foregoing problem, embodiments of the present invention provide a method for accessing a target application, so that a user can quickly access a target application that is set with an application password.

For the sake of brief description, in the embodiments of the present invention, a password, a gesture, or a fingerprint image that is used to unlock a screen is referred to as a screen unlocking password or an unlocking password, a password that is used to access a specific application is referred to as an application password, and a password that is used to access a specific function of the specific application is referred to as a function password. A screen locking password, the application password, and the function password may be set by using an application, or may be set by using a third party application. In addition, for the application that is set with the application password, in the embodiments of the present invention, triggering the application to run is referred to as "starting the application". An interface of password verification is usually displayed after the application is started. In the embodiments of the present invention, passing the password verification or skipping the password verification is referred to as "accessing the application". For example, for an album application that is set with an application password, after the user taps an application icon, the album application begins to run, that is, the album application is started. However, the user does not access the application at this moment. The user accesses the album application only after the user further inputs the password, password verification succeeds, and the terminal device displays albums or photos in the application.

According to a first aspect, an embodiment of the present invention provides a method for accessing a target application, where the method is applied to a terminal device on which a target application is installed, the target application is set with an application password that is used to access the target application, the terminal device is set with first fingerprint information that is used to unlock the terminal device, the terminal device is further set with an operation sequence corresponding to the first fingerprint information, and the operation sequence includes unlocking the terminal device and accessing the target application. The method includes: receiving input application password; sending, to an application server, a first message that carries the application password; receiving a second message that indicates that verification of the application password succeeds and that is sent by the application server; establishing a correspondence between the application password and the first fingerprint information based on the second message; receiving input second fingerprint information; and when a matching degree between the input second fingerprint information and the first fingerprint information exceeds a preset threshold, performing the operation sequence based on the correspondence between the application password and the first fingerprint information. According to the method, a user inputs fingerprint information only once and does not need to input the application password, to directly access the target application that is set with the application password when the target application does not begin to run. This simplifies a user operation and improves user experience when security is ensured.

According to the method for accessing a target application provided in the first aspect, this embodiment of the present invention further provides the following implementations, and these implementations may be used together to achieve a better technical effect.

In an implementation, the performing, by the terminal device, the operation sequence based on the correspondence between the application password and the first fingerprint information includes: unlocking the terminal device; sending, to the application server based on the correspondence between the application password and the first fingerprint information, a third message indicating that fingerprint verification succeeds (that is, the matching degree between the second fingerprint information and the first fingerprint information exceeds the preset threshold); and receiving a fourth message that indicates that an authentication success is acknowledged and that is sent by the application server, and then accessing the target application. In a process of performing the operation sequence, the terminal device skips or determines not to perform a step in which the terminal device displays an interface of inputting the application password, and the terminal device also skips or determines not to perform a step in which the terminal device sends the application password to the application server. Therefore, the user operation is simplified, and user experience is improved.

In another implementation, the terminal device receives input third fingerprint information before receiving the input application password. When a matching degree between the input third fingerprint information and the first fingerprint information exceeds a preset threshold, the terminal device then receives the input application password, so as to improve security.

In another implementation, the terminal device receives the input second fingerprint information when the target application does not begin to run.

In another implementation, the target application further includes a target function (for example, the target application is an album, and the target function is a special folder in the album; alternatively, the target application is an instant messaging application, and the target function is a "wallet" function in the instant messaging application). The target function is set with a function password that is used to access the target function, and the operation sequence further includes accessing the target function, that is, the operation sequence includes unlocking the terminal device, accessing the target application, and accessing the target function. In this case, after establishing the correspondence between the application password and the first fingerprint information, the terminal device further performs: receiving the input function password; sending, to the application server, a fifth message that carries the function password; receiving a sixth message that indicates that verification of the function password succeeds and that is sent by the application server; and establishing a correspondence between the function password and the first fingerprint information based on the sixth message.

In another implementation, after the correspondence between the function password and the first fingerprint information is established, the performing, by the terminal device, the operation sequence based on the correspondence between the application password and the first fingerprint information includes: unlocking the terminal device; sending, to the application server based on the correspondence between the application password and the first fingerprint information, the third message indicating that the fingerprint verification succeeds (that is, the matching degree between the second fingerprint information and the first fingerprint information exceeds the preset threshold); receiving the fourth message that indicates that the authentication success is acknowledged and that is sent by the application server, and then accessing the target application; sending, to the application server based on the correspondence between the function password and the first fingerprint information, a seventh message indicating that fingerprint verification succeeds; and receiving an eighth message that indicates that an authentication success is acknowledged and that is sent by the application server, and then accessing the target function. Although both the third message and the seventh message are messages that indicate that the fingerprint verification succeeds and that are sent by the terminal device to the application server, the two messages may be a same message, or may be different response messages that are sent by the terminal device for different transaction messages sent by the application server. Although both the fourth message and the eighth message are messages that indicate that the authentication success is acknowledged and that are sent by the application server, the two messages may be a same message, or may be different messages that indicate that the authentication success is acknowledged and that are sent by the application server for different transactions. In the process of performing the operation sequence, the terminal device skips or determines not to perform a step in which the terminal device displays interfaces of inputting the application password and the function password, and the terminal device also skips or determines not to perform a step in which the terminal device sends the application password and the function password to the application server. Therefore, the user operation is simplified, and user experience is improved.

In another implementation, when the terminal device is in an unlocked state before starting to perform the operation sequence, the terminal device skips or determines not to perform a step of unlocking the terminal device in the process of performing the operation sequence.

In another implementation, before establishing the correspondence between the application password and the first fingerprint information, the terminal device first generates a key, binds the key to the first fingerprint information, and sends, to the application server, a message that carries the key, so that the application server uses the key to mark the first fingerprint information.

According to a second aspect, an embodiment of the present invention provides a method for accessing a target application, where the method is applied to a terminal device on which a target application is installed, the target application is set with an application password that is used to access the target application, the terminal device is set with first fingerprint information that is used to unlock the terminal device, the terminal device is further set with an operation sequence corresponding to the first fingerprint information, the operation sequence includes unlocking the terminal device and accessing the target application, and the terminal device is further set with a correspondence between the application password and the first fingerprint information. The method includes: receiving input second fingerprint information; sending a fingerprint verification success message to an application server, where the fingerprint verification success message indicates that a matching degree between the second fingerprint information and the first fingerprint information exceeds a preset threshold; receiving an acknowledgment message sent by the application server; and responding to the acknowledgment message, and jumping from a screen locking interface to an interface that is displayed after the target application is accessed. According to the method, a user inputs fingerprint information only once and does not need to input the application password, to directly access the target application that is set with the application password when the target application does not begin to run. This simplifies a user operation and improves user experience when security is ensured.

According to the method for accessing a target application provided in the second aspect, this embodiment of the present invention further provides the following implementations, and these implementations may be used together to achieve a better technical effect.

In an implementation, the terminal device receives the input second fingerprint information when the target application does not begin to run.

In another implementation, the target application further includes a target function, the target function is set with a function password that is used to access the target function, and the operation sequence further includes accessing the target function, that is, the operation sequence includes unlocking the terminal device, accessing the target application, and accessing the target function. In the method for accessing a target application provided in the second aspect, "an interface that is displayed after the target application is accessed" is an interface that is displayed after the target function of the target application is accessed.

In another implementation, before receiving the input second fingerprint information, the terminal device sends a key that is bound to the first fingerprint information to the application server.

According to a third aspect, an embodiment of the present invention provides a terminal device, including: a fingerprint sensor; at least one memory, configured to store a target application, first fingerprint information that is used to unlock the terminal device, and an operation sequence corresponding to the first fingerprint information, where the target application is set with an application password that is used to access the target application, and the operation sequence includes unlocking the terminal device and accessing the target application; a touchscreen, configured to receive input application password; a transmitter, configured to send, to an application server, a first message that carries the application password; a receiver, configured to receive a second message that indicates that verification of the application password succeeds and that is sent by the application server; and at least one processor, configured to: establish a correspondence between the application password and the first fingerprint information based on the second message, and perform the operation sequence based on the correspondence between the application password and the first fingerprint information when a matching degree between second fingerprint information detected by the fingerprint sensor when the target application does not begin to run and the first fingerprint information exceeds a preset threshold.

On the terminal device, a user inputs fingerprint information only once and does not need to input the application password, to directly access the target application that is set with the application password when the target application does not begin to run. This simplifies a user operation and improves user experience when security is ensured.

According to the terminal device provided in the third aspect, this embodiment of the present invention further provides the following implementations, and these implementations may be used together to achieve a better technical effect.

In an implementation, that the processor is configured to perform the operation sequence based on the correspondence between the application password and the first fingerprint information includes: the processor is configured to: unlock the terminal device; instruct, based on the correspondence between the application password and the first fingerprint information, the transmitter to send, to the application server, a third message indicating that fingerprint verification succeeds; and access the target application based on a fourth message that is received by the receiver from the application server, where the fourth message indicates that an authentication success is acknowledged. In a process of performing the operation sequence, the processor skips or determines not to perform a step in which the processor instructs the touchscreen to display an interface of inputting the application password, and the terminal device also skips or determines not to perform a step in which the terminal device instructs the transmitter to send the application password to the application server. Therefore, the user operation is simplified, and user experience is improved.

In another implementation, the fingerprint sensor receives input third fingerprint information before the touchscreen receives the input application password. When a matching degree between the input third fingerprint information and the first fingerprint information exceeds a preset threshold, the touchscreen then receives the input application password, so as to improve security.

In another implementation, the fingerprint sensor receives the input second fingerprint information when the target application does not begin to run.

In another implementation, the target application includes a target function, the target function is set with a function password that is used to access the target function, and the operation sequence further includes accessing the target function. In this implementation, the processor is further configured to: instruct the transmitter to send a fifth message to the application server, where the fifth message carries input function password received by the touchscreen; and establish a correspondence between the function password and the first fingerprint information based on a sixth message that is received by the receiver from the application server, where the sixth message is used to indicate that verification of the function password succeeds.

In another implementation, after the correspondence between the function password and the first fingerprint information is established, that the processor is configured to perform the operation sequence based on the correspondence between the application password and the first fingerprint information includes: the processor is configured to: unlock the terminal device; instruct, based on the correspondence between the application password and the first fingerprint information, the transmitter to send, to the application server, the third message indicating that the fingerprint verification succeeds; access the target application based on the fourth message that is received by the receiver from the application server, where the fourth message indicates that the authentication success is acknowledged; further instruct, based on the correspondence between the function password and the first fingerprint information, the transmitter to send, to the application server, a seventh message indicating that fingerprint verification succeeds; and access the target application based on an eighth message that is received by the receiver from the application server, where the eighth message indicates that an authentication success is acknowledged. In the process of performing the operation sequence, the processor skips or determines not to instruct the touchscreen to display interfaces of inputting the application password and the function password, and the terminal device also skips or determines not to perform a step in which the terminal device instructs the transmitter to send the application password and the function password to the application server. Therefore, the user operation is simplified, and user experience is improved.

In another implementation, when the touchscreen is in an unlocked state before the processor starts to perform the operation sequence, the processor skips or determines not to perform a step of unlocking the terminal device in the process of performing the operation sequence.

In another implementation, the processor is further configured to: generate a key; bind the key to the first fingerprint information; and instruct the transmitter to send, to the application server, a ninth message that carries the key.

According to a fourth aspect, an embodiment of the present invention provides a terminal device, including: at least one memory, configured to store a target application, first fingerprint information that is used to unlock the terminal device, an operation sequence corresponding to the first fingerprint information, and a correspondence between the application password and the first fingerprint information, where the application password is used to access the target application, and the operation sequence includes unlocking the terminal device and accessing the target application; a fingerprint sensor, configured to receive input second fingerprint information; a transmitter, configured to send a fingerprint verification success message to an application server, where the fingerprint verification success message indicates that a matching degree between the second fingerprint information and the first fingerprint information exceeds a preset threshold; a receiver, configured to receive an acknowledgment message sent by the application server; and a touchscreen, configured to respond to the acknowledgment message, or according to an indication that responds to the acknowledgment message and that is sent by a processor, jump from a screen locking interface to an interface that is displayed after the target application is accessed.

On the terminal device, a user inputs fingerprint information only once and does not need to input the application password, to directly access the target application that is set with the application password when the target application does not begin to run. This simplifies a user operation and improves user experience when security is ensured.

According to the terminal device provided in the fourth aspect, this embodiment of the present invention further provides the following implementations, and these implementations may be used together to achieve a better technical effect.

In an implementation, the fingerprint sensor receives the input second fingerprint information when the target application does not begin to run.

In another implementation, the target application includes a target function, the target function is set with a function password that is used to access the target function, the operation sequence further includes accessing the target function, and "an interface that is displayed after the target application is accessed" is an interface that is displayed after the target function of the target application is accessed.

In another implementation, the transmitter is further configured to send a key that is bound to the first fingerprint information to the application server.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

As shown in FIG. 1A and FIG. 1B, for a mobile phone that is set with both a screen locking password and an application password, when the mobile phone is in a screen locking state, if a user wants to start a target application that is set with an application password, the user needs to first input the screen locking password, wait until a mobile phone screen is unlocked, find the target application, and then input the application password. Operations are relatively cumbersome. If a target function that the user wants to use in the target application is also set with a function password, the user further needs to input the function password. It can be learned that, from unlocking the screen to using the target function, the user needs to input a password three times in total and verification is performed three times. Operations not only are quite cumbersome, but also take a long time.

CN104182275A discloses that, when a user needs to quickly start a specific application, a terminal device may obtain fingerprint information of the user, then search for the application that is associated with the obtained fingerprint information, and directly start the application after finding the application that is associated with the obtained fingerprint information.

However, for an application that is set with an application password, when the foregoing method is used, after the application that is associated with the obtained fingerprint information is found, the application cannot be directly started, and the user can only stay in a screen locking interface or an interface of inputting the application password. The user first needs to manually input a password and then starts the application after password verification succeeds. This is not fast and convenient enough.

Figure 2:
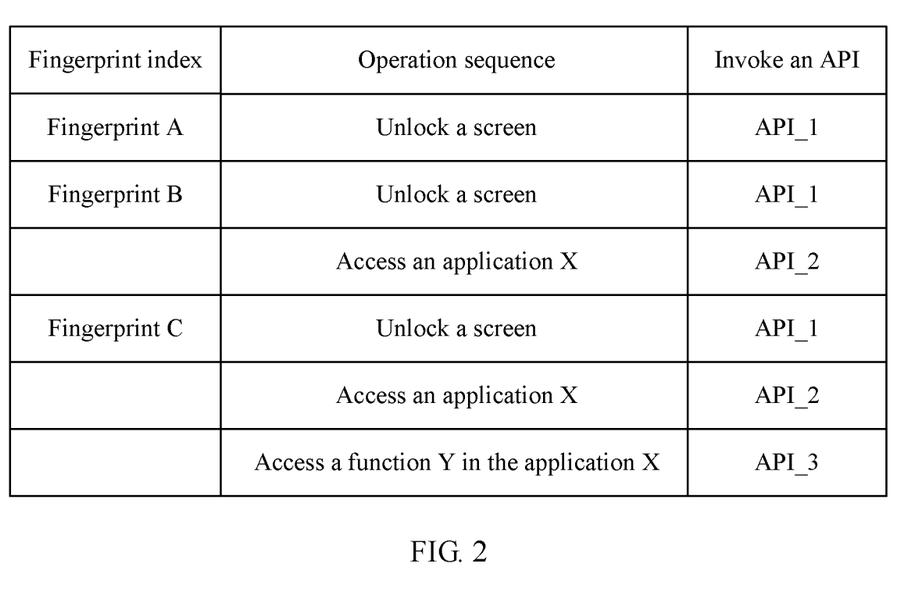
FIG. 2 is a fingerprint registry according to an embodiment of the present invention.

An embodiment of the present invention provides a method for accessing a target application, so that a user can quickly access the target application that is set with an application password by inputting fingerprint information only once. When using the method to access the target application, the user first needs to register a fingerprint on a terminal device. FIG. 2 is a fingerprint registry according to an embodiment of the present invention.

As shown in FIG. 2, it is assumed that three fingerprints are recorded on the terminal device: a fingerprint A, a fingerprint B, and a fingerprint C, and the terminal device records an operation sequence registered for (or corresponding to) each fingerprint. In FIG. 2, an operation sequence registered for the fingerprint A includes unlocking a screen, an operation sequence registered for the fingerprint B includes unlocking the screen and accessing an application X, and an operation sequence registered for the fingerprint C includes unlocking the screen, accessing the application X, and accessing a function Y of the application X. The operation sequence herein refers to one or more operations performed in order. For example, when the terminal device detects that fingerprint information is input, where a matching degree between the fingerprint information and the fingerprint B exceeds a preset threshold, the terminal device unlocks the screen and accesses the application X in turn. It should be noted that, when the terminal device detects, in a process of performing the operation sequence, that an operation has been completely performed, the terminal device skips the operation and continues to perform a next operation. For example, when the terminal device in an unlocked state detects that fingerprint information is input, where a matching degree between the fingerprint information and the fingerprint B exceeds a preset threshold, the terminal device skips the operation of unlocking the screen, and directly accesses the application X. When performing each operation in the operation sequence, the terminal device invokes a related application programming interface (English: application programming interface, API for short). For example, when the terminal device in an unlocked state detects that fingerprint information is input, where a matching degree between the fingerprint information and the fingerprint C exceeds a preset threshold, the terminal device first invokes an API_1 to unlock the screen, then invokes an API_2 to access the application X, and finally invokes an API_3 to access the function Y of the application X. FIG. 2 is used merely as an example. When a person skilled in the art implements this embodiment of the present invention, the terminal device may use any form to register an operation sequence corresponding to a specific fingerprint. The terminal device may also receive a new fingerprint record, and then immediately register an operation sequence for the new fingerprint.

Figure 3:
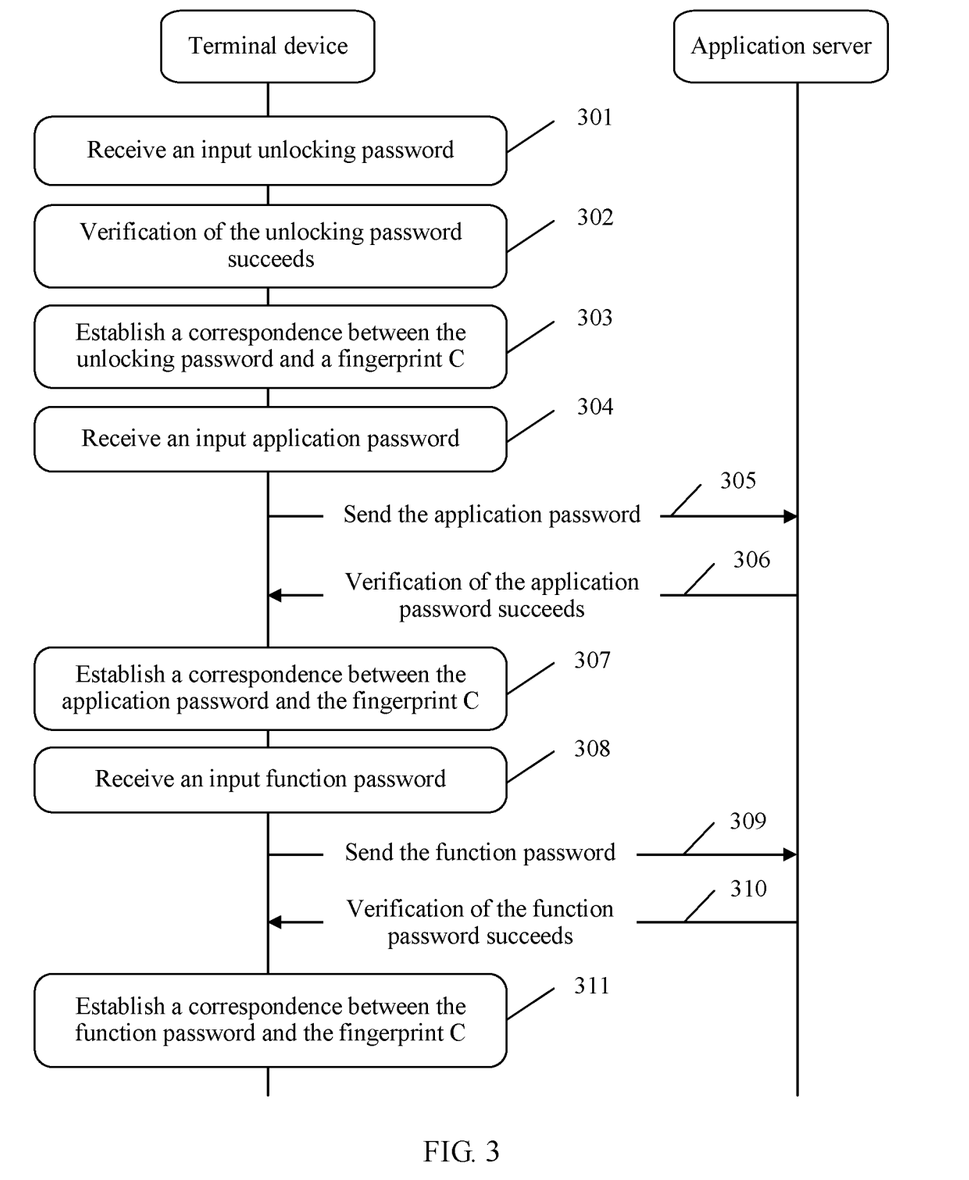
FIG. 3 is a flowchart of authorizing a fingerprint according to an embodiment of the present invention.

After completing the fingerprint registration, the terminal device further needs to authorize the fingerprint. FIG. 3 is a flowchart of fingerprint authorization using a fingerprint C in FIG. 2 as an example according to an embodiment of the present invention. After registration of an operation sequence corresponding to the fingerprint C is completed, because the operation sequence registered for the fingerprint C includes unlocking a screen, accessing an application X, and accessing a function Y of the application X, the terminal device authorizes the fingerprint C, that is, the terminal device associates an application password of the application X and a function password of the function Y with the fingerprint C. As shown in FIG. 3, when the fingerprint C is being authorized, the terminal device first performs verification on a screen unlocking password. The terminal device receives an input unlocking password (as shown in 301), and when the terminal device determines that the input unlocking password matches a preset unlocking password, acknowledges that the verification succeeds (as shown in 302), and then the terminal device establishes a correspondence between the fingerprint C and the unlocking password in a database (as shown in 303). If the verification fails, the terminal device stays in an interface of waiting for inputting the unlocking password (not shown in the figure).

The terminal device further receives the input application password (as shown in 304). After receiving the input application password, the terminal device sends the received application password to an application server (as shown in 305). The application server performs verification on the received application password, and when the verification succeeds, the application server sends a verification result to the terminal device (as shown in 306), and then the terminal device establishes a correspondence between the fingerprint C and the application password in the database (as shown in 307). If the verification fails, the terminal device stays in an interface of waiting for inputting the application password (not shown in the figure).

On the other hand, because information about the fingerprint C is saved in a trusted execution environment (Trusted Execution Environment, TEE for short) of the terminal device, for the sake of security of fingerprint information, the terminal device does not send the information about the fingerprint C to the application server, but generates a key, binds the key to the fingerprint C, and then sends the key to the application server. The application server saves the key as a token (Token) of the fingerprint C to mark the fingerprint C. These steps may be performed before, after, or when the terminal device establishes the correspondence between the fingerprint C and the application password (not shown in the figure).

The terminal device further receives the input function password (as shown in 308), and performs steps (as shown in 309 and 310) similar to those performed after the terminal device receives the input application password, to establish a correspondence between the fingerprint C and the function password (as shown in 311).

In FIG. 3, if the fingerprint C has been set as a screen unlocking password before the fingerprint authorization, a step of verifying the screen unlocking password may be skipped, and verification may be directly performed on the application password and the function password. If before the fingerprint authorization is performed for the fingerprint C, at least one of the application password or the function password has been set as the fingerprint C, that is, the terminal device is set to access the application X and/or the function Y of the application X when determining that a matching degree between the input fingerprint information and the information about the fingerprint C exceeds a preset threshold, it may be considered that the correspondence between the application password and/or the function password and the fingerprint C has been established. The terminal device may skip a verification phase of the application password and/or the function password to improve efficiency, or the terminal device may not skip any verification phase to enhance security. If before the fingerprint authorization is performed for the fingerprint C, at least one of the application password or the function password has been set as another fingerprint such as a fingerprint B, when performing the fingerprint authorization for the fingerprint C, the terminal device may delete information about an association between the fingerprint B and the application password or the function password. If the application X is not set with the application password or the function Y is not set with the function password, the terminal device establishes only the correspondence between the application password or the function password and the fingerprint C. In addition, when authorizing the fingerprint, the terminal device may first verify the fingerprint once to enhance security.

Figure 4:
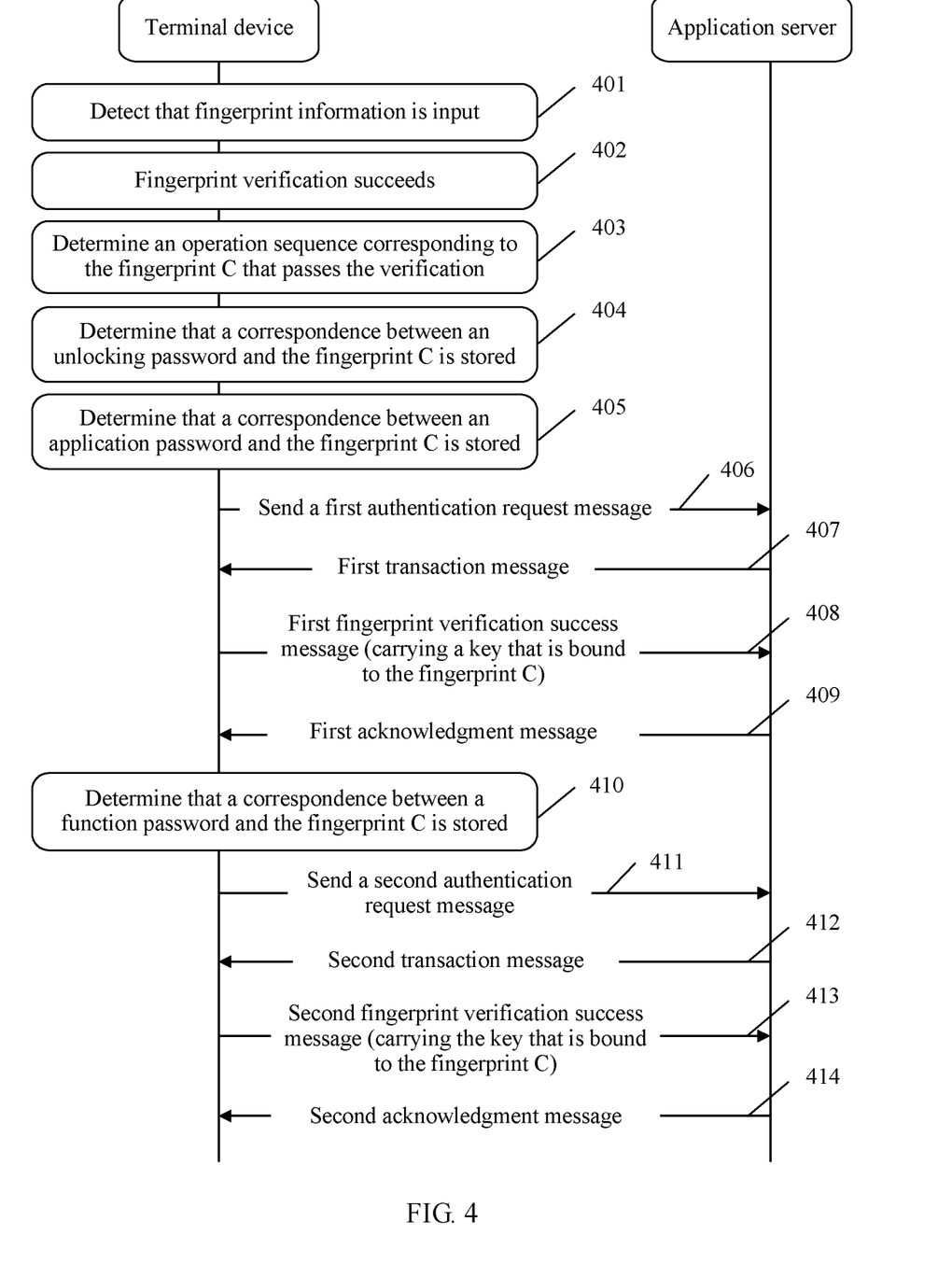
FIG. 4 is a flowchart of a method for accessing a target application according to an embodiment of the present invention.

FIG. 4 is a flowchart of a method for accessing a target application using a fingerprint C in FIG. 2 as an example. After fingerprint authorization is completed, a terminal device may quickly access the target application by inputting fingerprint information once. Before accessing the target application, the terminal device may be in a screen locking state or in an unlocked state. When the terminal device is in the unlocked state, the terminal device may display any interface. When the terminal device detects that fingerprint information is input (as shown in 401), the terminal device performs verification on the input fingerprint information. When the terminal device determines that fingerprint verification succeeds (as shown in 402), that is, a matching degree between the input fingerprint information and any fingerprint (for example, a fingerprint A, a fingerprint B, or a fingerprint C) pre-registered in the terminal device exceeds a preset threshold, the terminal device searches for an operation sequence corresponding to a matching fingerprint. With reference to FIG. 2 for description, if the matching fingerprint is the fingerprint C, an operation sequence that is corresponding to the fingerprint C and that is found by the terminal device includes unlocking a screen, accessing an application X, and accessing a function Y of the application X (as shown in 403), and then the terminal device determines whether a correspondence between the fingerprint C and an unlocking password is stored. If the correspondence between the fingerprint C and an unlocking password is stored (as shown in 404), the terminal device no longer receives and verifies the unlocking password, but uses a verification result of the fingerprint C to replace verification of the unlocking password.

The terminal device further determines whether a correspondence between the fingerprint C and an application password of the application X is stored. If the correspondence between the fingerprint C and the application password of the application X is stored (as shown in 405), the terminal device sends a first authentication request message to an application server (as shown in 406). After receiving the authentication request message, the application server sends a first transaction message to the terminal device (as shown in 407). Optionally, the first transaction message is sent to a trusted application (Trusted Application, TA for short, and the trusted application and the application X may be provided by a same vendor) in a TEE of the terminal device. After the TA determines that fingerprint verification succeeds, the terminal device sends a fingerprint verification result and a key that is bound to the fingerprint C to the application server (as shown in 408). The application server compares the received key with a previously stored key. If the received key is consistent with the previously stored key, the application server sends, to the terminal device according to the received fingerprint verification result, a first acknowledgment message indicating that verification of the application password succeeds (as shown in 409).

In this embodiment of the present invention, the terminal device does not display an interface of inputting the application password, and the application server does not verify the application password, but uses the fingerprint verification result in step 402 to replace a verification result of the application password. If the fingerprint verification succeeds in step 402, the application server directly sends, to the terminal device, the first acknowledgment message indicating that the verification of the application password succeeds.

The terminal device further determines whether a correspondence between the fingerprint C and a function password of the function Y is stored. If the correspondence between the fingerprint C and the function password of the function Y is stored (as shown in 410), the terminal device and the application server separately perform steps similar to 406 to 409 (as shown in 411 to 414), and finally, the application server sends, to the terminal device according to the received fingerprint verification result, a second acknowledgment message indicating that verification of the function password succeeds (as shown in 414).

After receiving the acknowledgment message indicating that the verification of the function password succeeds, the terminal device invokes an API_1, air API_2, and an API_3 in turn to perform operations of unlocking the screen, accessing the application X, and accessing the function Y of the application X, It should be noted that, "unlocking the screen", "accessing the application X", and "accessing the function Y of the application X" are consecutively performed. For this embodiment of the present invention, an interface that is displayed after the function Y is accessed is usually a first interface that is displayed after the terminal device is unlocked. Alternatively, after the terminal device is unlocked, the terminal device may still display a system interface (which may be also referred to as a main interface or a home screen) and a loading interface of the application X for a short time, and then display the interface that is displayed after the function Y is accessed. The foregoing "an interface of accessing the application X" may be a main interface or a home screen of the application X, or may be an interface of any function in the application X. "An interface that is displayed after the function Y is accessed" may be a main interface or a home screen of the function Y, or may be an interface of any subfunction in the function Y.

In this embodiment, after the terminal device finds the operation sequence corresponding to the matching fingerprint, if it is found that at least one operation in the operation sequence has been performed, the terminal device skips the operation that has been performed, and then in turn, performs an operation that has not been performed. The fingerprint C is still used as an example. After the terminal device receives the acknowledgment message indicating that the verification of the function password succeeds, if it is found that the terminal device is unlocked and accesses the application X, the terminal device jumps from the interface of the application X to the interface that is displayed after the function Y is accessed. If the application X is not set with the application password or the function Y is not set with the function password, in this embodiment, the terminal device sends an authentication request message only once for the application password or the function password.

Figure 5:
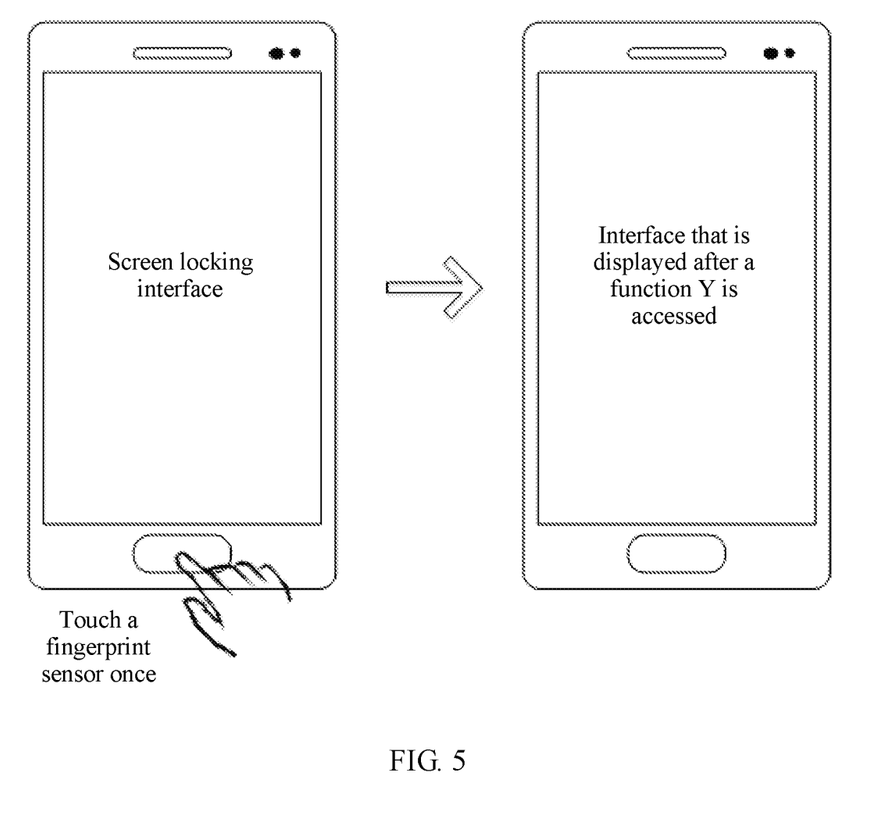
FIG. 5 is a schematic diagram of a method for accessing a target function of a target application according to an embodiment of the present invention.

FIG. 5 is a schematic diagram of a method for accessing a target function of a target application according to an embodiment of the present invention. As shown in FIG. 5, compared with the method in FIG. 1A and FIG. 1B, using the method for accessing a target application provided in this embodiment of the present invention may enable a user to quickly access the target function by inputting fingerprint information once when a terminal device is in a screen locking state. This greatly improves user experience when security is ensured. Certainly, the user may also quickly access the target application or the target function by inputting the fingerprint information once when the terminal device in an unlocked state displays any interface. This is not limited to an example in FIG. 5.

Figure 6:
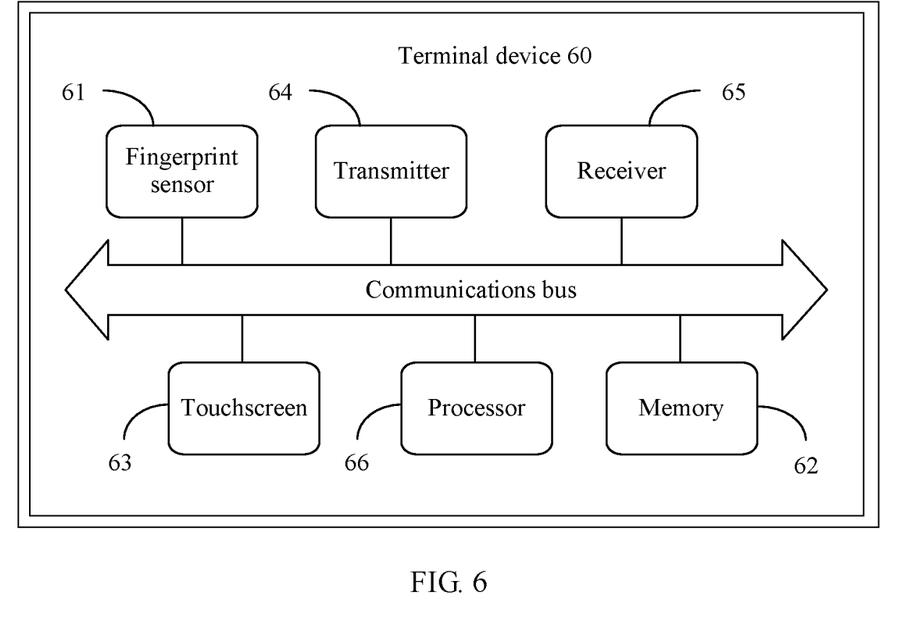
FIG. 6 is a structural diagram of a terminal device according to an embodiment of the present invention.

FIG. 6 shows an apparatus 60 for accessing a target application according to an embodiment of the present invention, including:

a fingerprint sensor 61; at least one memory 62, configured to store a target application, first fingerprint information that is used to unlock a terminal device, and an operation sequence corresponding to the first fingerprint information, where the target application is set with an application password that is used to access the target application, and the operation sequence includes unlocking the terminal device and accessing the target application; a touchscreen 63, configured to receive input application password; a transmitter 64, configured to send, to an application server, a first message that carries the application password; a receiver 65, configured to receive a second message that indicates that verification of the application password succeeds and that is sent by the application server; and at least one processor 66, configured to: establish a correspondence between the application password and the first fingerprint information based on the second message, and perform the operation sequence based on the correspondence between the application password and the first fingerprint information when a matching degree between second fingerprint information detected by the fingerprint sensor and the first fingerprint information exceeds a preset threshold.

It should be understood that, the terminal device in this embodiment of the present invention may be configured to implement the foregoing method embodiments. For example, the touchscreen is configured to receive the input application password or function password, the fingerprint sensor is configured to receive input fingerprint information, the transmitter and the receiver are configured to exchange information with the application server, the memory is configured to store fingerprint information, a correspondence between the fingerprint information and the application password and/or the function password, and the operation sequence corresponding to the fingerprint information, and the processor is configured to: send an instruction to another component, and perform various processing operations. Descriptions of various examples and optional solutions in the foregoing method embodiments are applicable to the terminal device in this embodiment of the present invention.

It should be understood that in all the foregoing embodiments of the present invention, the processor may be a central processing unit (Central Processing Unit, CPU for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any normal processor, or the like.

The memory may include a read-only memory and a random access memory, store program code, and provide an instruction and data to the processor.

The communications bus may further include a power bus, a control bus, a status signal bus, and the like, in addition to a data bus. However, for clear description, various types of buses in the figure are marked as the communications bus.

In an implementation process, steps in the foregoing methods can be implemented by using a hardware integrated logical circuit in the processor, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It may be clearly understood by a person skilled in the art that, for ease and brevity of description, for a detailed working process of the foregoing system, apparatus, and unit, refer to a corresponding process in the foregoing method embodiments, and details are not described herein again.

What is claimed is:

1. A method for accessing a target application, comprising:
   receiving, by a terminal device, an application password, wherein the target application is installed on the terminal device and is set with the application password to access the target application, wherein the terminal device is set with first fingerprint information to unlock the terminal device and an operation sequence corresponding to the first fingerprint information, and wherein the operation sequence comprises unlocking the terminal device and accessing the target application;
   sending, by the terminal device to an application server, a first message carrying the application password;
   receiving, by the terminal device, a second message from the application server indicating that verification of the application password succeeds;
   establishing and storing, by the terminal device, a correspondence between the application password and the first fingerprint information based on the second message;
   receiving, by the terminal device, second fingerprint information;
   comparing, by the terminal device, the first fingerprint information and the second fingerprint information to determine a matching degree; and
   performing, by the terminal device, the operation sequence based on the correspondence between the application password and the first fingerprint information when the matching degree between the second fingerprint information and the first fingerprint information exceeds a preset threshold.

2. The method of claim 1, wherein performing the operation sequence comprises:
   unlocking, by the terminal device, the terminal device;
   sending, by the terminal device to the application server based on the correspondence between the application password and the first fingerprint information, a third message indicating that the matching degree between the second fingerprint information and the first fingerprint information exceeds the preset threshold;
   receiving, by the terminal device, a fourth message from the application server indicating that an authentication success is acknowledged; and
   accessing, by the terminal device, the target application according to the fourth message.

3. The method of claim 1, wherein the target application comprises a target function, wherein the target function is set with a function password to access the target function, wherein the operation sequence further comprises accessing the target function, and wherein after establishing the correspondence between the application password and the first fingerprint information, the method further comprises:
   receiving, by the terminal device, the function password;
   sending, by the terminal device to the application server, a fifth message carrying the function password;
   receiving, by the terminal device, a sixth message from the application server indicating that verification of the function password succeeds; and
   establishing, by the terminal device, a correspondence between the function password and the first fingerprint information based on the sixth message.

4. The method of claim 3, wherein performing the operation sequence comprises:
   unlocking, by the terminal device, the terminal device;
   sending, by the terminal device to the application server based on the correspondence between the application password and the first fingerprint information, a third message indicating that the matching degree between the second fingerprint information and the first fingerprint information exceeds the preset threshold;
   receiving, by the terminal device, a fourth message from the application server indicating that an authentication success is acknowledged;
   accessing, by the terminal device, the target application according to the fourth message;

sending, by the terminal device to the application server based on the correspondence between the function password and the first fingerprint information, a seventh message indicating that the matching degree between the second fingerprint information and the first fingerprint information exceeds the preset threshold;

receiving, by the terminal device, an eighth message from the application server indicating that the authentication success is acknowledged; and accessing, by the terminal device, the target function according to the eighth message.

5. The method of claim 1, further comprising skipping, by the terminal device, a step of unlocking the terminal device in a process of performing the operation sequence when the terminal device is in an unlocked state before starting to perform the operation sequence.

6. The method of claim 1, wherein before establishing the correspondence between the application password and the first fingerprint information, the method further comprises:
generating, by the terminal device, a key;
binding, by the terminal device, the key to the first fingerprint information; and
sending, by the terminal device to the application server, a ninth message carrying the key.

7. The method of claim 1, further comprising determining, by the terminal device, not to perform a step of unlocking the terminal device in a process of performing the operation sequence when the terminal device is in an unlocked state before starting to perform the operation sequence.

8. A method for accessing a target application, comprising:
receiving, by a terminal device, second fingerprint information, wherein the target application is installed on the terminal device and is set with an application password to access the target application, wherein the terminal device is set with first fingerprint information to unlock the terminal device and an operation sequence corresponding to the first fingerprint information, wherein the operation sequence comprises unlocking the terminal device and accessing the target application, and wherein the terminal device is further set with a correspondence between the application password and the first fingerprint information;
sending, by the terminal device, a fingerprint verification success message to an application server, wherein the fingerprint verification success message indicates that a matching degree between the second fingerprint information and the first fingerprint information exceeds a preset threshold;
receiving, by the terminal device, an acknowledgment message from the application server;
responding, by the terminal device, to the acknowledgment message; and
switching, by the terminal device, from a screen locking interface to an interface displayed after the target application is accessed.

9. The method of claim 8, wherein the target application comprises a target function, wherein the target function is set with a function password to access the target function, wherein the operation sequence further comprises accessing the target function, and wherein the interface displayed after the target application is accessed comprises an interface displayed after the target function is accessed.

10. The method of claim 8, wherein before receiving the second fingerprint information, the method further comprises sending a key bound to the first fingerprint information to the application server.

11. A terminal device, comprising:
a fingerprint sensor;
at least one memory configured to store a target application, wherein first fingerprint information unlocks the terminal device, wherein an operation sequence corresponds to the first fingerprint information, wherein the target application is set with an application password to access the target application, and wherein the operation sequence comprises unlocking the terminal device and accessing the target application;
a touchscreen configured to receive the application password;
a transmitter configured to send to an application server, a first message carrying the application password;
a receiver configured to receive a second message from the application server indicating that verification of the application password succeeds; and
at least one processor coupled to the fingerprint sensor, the at least one memory, the touchscreen, the transmitter, and the receiver and configured to:
establish and store a correspondence between the application password and the first fingerprint information based on the second message;
compare the first fingerprint information and the second fingerprint information to determine a matching degree; and
perform the operation sequence based on the correspondence between the application password and the first fingerprint information when the matching degree between second fingerprint information detected by the fingerprint sensor and the first fingerprint information exceeds a preset threshold.

12. The terminal device of claim 11, wherein in a manner of performing the operation sequence, the at least one processor is further configured to:
unlock the terminal device;
instruct, based on the correspondence between the application password and the first fingerprint information, the transmitter to send to the application server, a third message indicating that the matching degree between the second fingerprint information and the first fingerprint information exceeds the preset threshold; and
access the target application based on a fourth message received by the receiver from the application server, the fourth message indicating that an authentication success is acknowledged.

13. The terminal device of claim 11, wherein the target application comprises a target function, wherein the target function is set with a function password to access the target function, wherein the operation sequence further comprises accessing the target function, and wherein the at least one processor is further configured to:
instruct the transmitter to send a fifth message to the application server, wherein the fifth message carries the function password received by the touchscreen; and
establish a correspondence between the function password and the first fingerprint information based on a sixth message received by the receiver from the application server, wherein the sixth message indicates that verification of the function password succeeds.

14. The terminal device of claim 13, wherein in a manner of performing the operation sequence based on the correspondence between the application password and the first fingerprint information, the at least one processor is further configured to:

unlock the terminal device;
instruct, based on the correspondence between the application password and the first fingerprint information, the transmitter to send to the application server, a third message indicating that the matching degree between the second fingerprint information and the first fingerprint information exceeds the preset threshold;
access the target application based on a fourth message received by the receiver from the application server, the fourth message indicating that an authentication success is acknowledged;
instruct, based on the correspondence between the function password and the first fingerprint information, the transmitter to send to the application server, a seventh message indicating that the matching degree between the second fingerprint information and the first fingerprint information exceeds the preset threshold; and
access the target application based on an eighth message received by the receiver from the application server, wherein the eighth message indicates that the authentication success is acknowledged.

15. The terminal device of claim 11, wherein the at least one processor is further configured to skip a step of unlocking the terminal device in a process of performing the operation sequence when the touchscreen is in an unlocked state before the at least one processor starts to perform the operation sequence.

16. The terminal device of claim 11, wherein the at least one processor is further configured to:
generate a key;
bind the key to the first fingerprint information; and
instruct the transmitter to send to the application server, a ninth message carrying the key.

17. The terminal device of claim 11, wherein the at least one processor is further configured to determine not to perform a step of unlocking the terminal device in a process of performing the operation sequence when the touchscreen is in an unlocked state before the at least one processor starts to perform the operation sequence.

18. A terminal device, comprising:
at least one memory configured to store:
a target application, wherein the target application is set with an application password to access the target application;
first fingerprint information to unlock the terminal device;
an operation sequence corresponding to the first fingerprint information, wherein the operation sequence comprises unlocking the terminal device and accessing the target application; and
a correspondence between the application password and the first fingerprint information;
a fingerprint sensor configured to receive second fingerprint information;
a transmitter configured to send a fingerprint verification success message to an application server, wherein the fingerprint verification success message indicates that a matching degree between the second fingerprint information and the first fingerprint information exceeds a preset threshold;
a receiver configured to receive an acknowledgment message from the application server; and
a touchscreen coupled to the at least one memory, the fingerprint sensor, the transmitter, and the receiver and configured to:
respond to the acknowledgment message; and
switch from a screen locking interface to an interface displayed after the target application is accessed.

19. The terminal device of claim 18, wherein the target application comprises a target function, wherein the target function is set with a function password to access the target function, wherein the operation sequence further comprises accessing the target function, and wherein the interface displayed after the target application is accessed is an interface displayed after the target function is accessed.

20. The terminal device of claim 18, wherein the transmitter is further configured to send a key bound to the first fingerprint information to the application server.

* * * * *